(12) United States Patent
Luo et al.

(10) Patent No.: US 11,388,282 B2
(45) Date of Patent: Jul. 12, 2022

(54) METHOD AND APPARATUS FOR CONTROLLING VIDEO

(71) Applicant: BEIJING XIAOMI MOBILE SOFTWARE CO., LTD., Beijing (CN)

(72) Inventors: Xi Luo, Beijing (CN); Ming Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/907,402

(22) Filed: Jun. 22, 2020

(65) Prior Publication Data

US 2021/0211538 A1 Jul. 8, 2021

(30) Foreign Application Priority Data

Jan. 3, 2020 (CN) .......................... 202010006395.1

(51) Int. Cl.
*H04N 21/485* (2011.01)
*H04M 1/72454* (2021.01)
*H04M 1/72427* (2021.01)

(52) U.S. Cl.
CPC ... *H04M 1/72454* (2021.01); *H04M 1/72427* (2021.01); *H04N 21/4854* (2013.01); *H04N 21/4858* (2013.01)

(58) Field of Classification Search
CPC .......... H04N 21/4854; H04N 21/4858; H04N 21/47205; G06F 3/0484; G06F 3/0488; H04M 1/724
See application file for complete search history.

(56) References Cited

U.S. PATENT DOCUMENTS

2002/0184623 A1 12/2002 Hodge et al.
2007/0126877 A1 6/2007 Yang
(Continued)

FOREIGN PATENT DOCUMENTS

CN 106101809 A 11/2016
CN 107257510 A 10/2017
(Continued)

OTHER PUBLICATIONS

YouTube video, "Getting Started: Video viewing basics," published Sep. 28, 2018, downloaded from https://www.youtube.com/watch?v=xbBr5b3-wSQ&t=4s (Year: 2018).*
(Continued)

*Primary Examiner* — Eric J Yoon
(74) *Attorney, Agent, or Firm* — Syncoda LLC; Feng Ma

(57) ABSTRACT

A method for video control can be applied to a terminal. The method can include: displaying video application setup options on a video playback interface for setting video application functions corresponding to video usage effects; receiving a setup operation by one of video application setup options; correspondingly processing and playing video data to be played according to a video application function corresponding to the setup operation. By additionally providing a video application setup option, the terminal can perform various processing operations on a video, for example, free from video processing functions of various video applications, and perform, according to an operation instruction initiated by a user, corresponding video processing operations on various video applications and various video scenarios.

16 Claims, 13 Drawing Sheets

(56) References Cited

U.S. PATENT DOCUMENTS

| | | | | |
|---|---|---|---|---|
| 2013/0311561 A1* | 11/2013 | Ku | ................ | H04N 21/4788 |
| | | | | 709/204 |
| 2015/0052466 A1* | 2/2015 | Chun | ................ | G06F 3/0484 |
| | | | | 715/769 |
| 2015/0100885 A1* | 4/2015 | Riley | ................ | G06F 3/04883 |
| | | | | 715/720 |
| 2017/0171270 A1 | 6/2017 | Qu | | |
| 2020/0195877 A1 | 6/2020 | Li | | |

FOREIGN PATENT DOCUMENTS

| | | | |
|---|---|---|---|
| CN | 109151546 A | | 1/2019 |
| EP | 2840493 A1 | | 2/2015 |
| JP | 2003319343 A | | 11/2003 |

OTHER PUBLICATIONS

YouTube video by user myoldtechchannel, "How To Use YouTube: App Tutorial (HD)," published Aug. 13, 2015, downloaded from https://www.youtube.com/watch?v=mTerLFDGjnM (Year: 2015).*

F. Wahab, "How to Turn Your Screen Black and White," published Dec. 15, 2017, downloaded from https://www.addictivetips.com/windows-tips/turn-your-screen-black-white/ (Year: 2017).*

D. Nield, "How to Remap How to Remap the Buttons on Your Android Device to Do Nearly Anything You Want," published May 22, 2019, https://gizmodo.com/how-to-remap-the-buttons-on-your-android-device-to-do-n-1834942538 (Year: 2019).*

YouTube video by user geekyrankjit, "Watch YouTube videos offline with YouTube Offline," published Jun. 11, 2015, downloaded from https://www.youtube.com/watch?v=jQwrQmsxskk (Year: 2015).*

YouTube video, "Tutorial: Introduction to VLC Player for PC," published Jun. 9, 2015, downloaded at https://www.youtube.com/watch?v=sRn7WAGFlyg (Year: 2015).*

"VLC for Android—Your Complete Guide," dated Jun. 15, 2019 by waybackmachine.org, downloaded at http://web.archive.org/web/20190615042540/https://www.vlchelp.com/android-complete-guide/ (Year: 2019).*

Extended European Search Report in Application No. 20185070.8, dated Aug. 25, 2020.

First Office Action in Application No. CN 202010006395.1 dated Jun. 25, 2021.

* cited by examiner

METHOD AND APPARATUS FOR CONTROLLING VIDEO

CROSS-REFERENCE TO RELATED APPLICATION

This application claims priority to Chinese Patent Application No. 202010006395.1 filed on Jan. 3, 2020, the disclosure of which is hereby incorporated by reference in its entirety.

BACKGROUND

Video applications installed on a terminal can have various setup functions. For example, when a user uses a certain video application, a number of setup operations can be performed according to the user's requirements. The setup functions can include collection, downloading, screen projection, sound effect adjustment, quick adjustment of frame rate, close time setting, etc.

When the user uses the collection function, information about the currently played video can be stored in a user account corresponding to the video software. When the user uses the screen projection function, the video data can be played by other display devices. When the user uses the sound effect adjustment function, the effect of the picture or sound of the currently played video can be changed.

SUMMARY

The present disclosure relates generally to video processing technologies, and more specifically to a method and apparatus for video control.

In accordance with a first aspect of the embodiments of the present disclosure, a method for video control is provided, which is applied to a terminal equipment, the method including:

displaying video application setup options on a video playback interface, the video application setup options being used for setting video application functions corresponding to video usage effects;

receiving a setup operation by one of video application setup options; and correspondingly processing and playing video data to be played according to a video application function corresponding to the setup operation.

In some embodiments, the method further includes:

receiving a call operation of the video application setup option; and displaying, according to the call operation, the video application setup option on the video playback interface.

In some embodiments, in the method, the video application setup options at least include options corresponding to any one of the following video application functions:

a first type of options used for setting display effects of a video application; and a second type of options used for setting interaction effects of the video application interacting with other applications.

In some embodiments, in the method, the receiving a setup operation by one of the video application setup options includes:

receiving any one or more of the following setup operations by the first type of options:

an operation of setting a video playback mode;
an operation of setting a video storage mode;
an operation of setting a video display effect; and
an operation of setting a video sound effect.

In some embodiments, in the method, the receiving a setup operation by one of the video application setup options includes:

receiving any one or more of the following setup operations by the second type of options:

an operation of setting display of other applications on the video playback interface; and an operation of setting transmission of video data to other applications.

In some embodiments, the method further including:

setting configuration information of the video application setup option, the configuration information at least including any one of the following information:

a call mode of the video application setup option;
a display mode of the video application setup option; and
an application range of the video application setup option.

In accordance with a second aspect of the embodiments of the present disclosure, an apparatus for video control is provided, including:

a processor; and a memory configured to store instructions executable for the processor that, when executed by the processor, causes the processor to:

display video application setup options on a video playback interface, the video application setup options being used for setting video application functions corresponding to video usage effects;

receive a setup operation by one of video application setup options; and correspondingly process and play video data to be played according to a video application function corresponding to the setup operation.

In some embodiments, the apparatus further include the instructions further causes the processor to:

receive a call operation of the video application setup option; and display, according to the call operation, the video application setup option on the video playback interface.

In some embodiments, in the apparatus, the video application setup options at least includes any one of the following options:

a first type of options used for setting display effects of a video application; and a second type of options used for setting interaction effects of the video application interacting with other applications.

In some embodiments, in the apparatus, the instructions further causes the processor to:

receiving any one or more of the following setup operations by the first type of options:

an operation of setting a video playback mode;
an operation of setting a video storage mode;
an operation of setting a video display effect; and
an operation of setting a video sound effect.

In some embodiments, in the apparatus, the instructions further causes the processor to:

receiving any one or more of the following setup operations by the second type of options:

an operation of setting display of other applications on the video playback interface; and an operation of setting transmission of video data to other applications.

In some embodiments, in the apparatus further, the instructions further cause the processor to:

set configuration information of the video application setup option, the configuration information at least including any one of the following information:

a call mode of the video application setup option;
a display mode of the video application setup option; and
an application range of the video application setup option.

In accordance with a third aspect of the embodiments of the present disclosure, a non-temporary computer-readable storage medium is provided, instructions in the storage medium, when executed by a processor of a terminal equipment, enabling the terminal equipment to execute a method for video control, the method including operations of:

displaying video application setup options on a video playback interface, the video application setup options being used for setting video application functions corresponding to video usage effects;

receiving a setup operation by one of video application setup options; and correspondingly processing and playing video data to be played according to a video application function corresponding to the setup operation.

It should be understood that the foregoing general description and the following detailed description are merely exemplary and explanatory and are not intended to limit the present disclosure.

BRIEF DESCRIPTION OF THE DRAWINGS

The accompanying drawings to be described herein are incorporated into this disclosure and constitute a part of this disclosure. These accompanying drawings show the embodiments of the present disclosure, and are used with this specification to explain the principle of the present disclosure.

DETAILED DESCRIPTION

Figure 1:
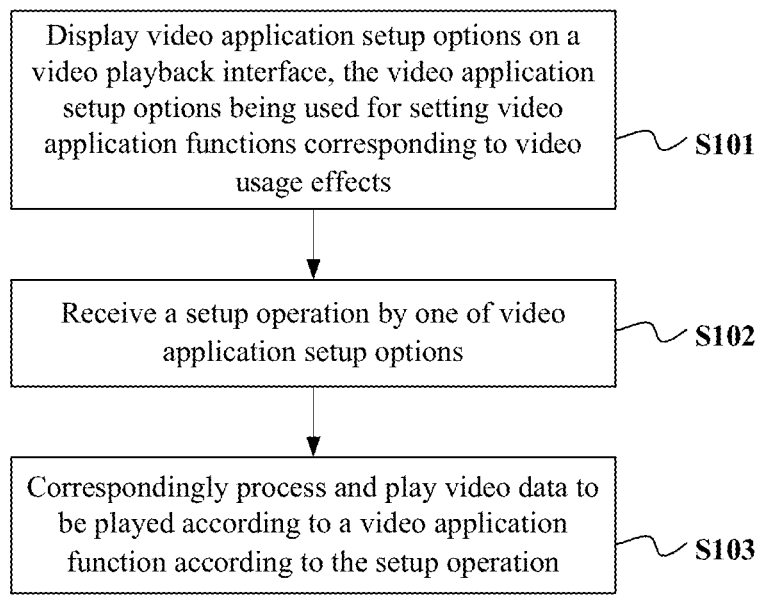
FIG. 1 is a flowchart of a method for video control according to some embodiments.

Exemplary embodiments will be described in detail herein, and examples in the exemplary embodiments are shown in the accompanying drawings. When the accompanying drawings are involved in the following description, unless otherwise indicated, identical reference numerals in different accompanying drawings indicate identical or similar elements. The implementations described in the following exemplary embodiments do not represent all implementations consistent with the present disclosure. Instead, these implementations are merely examples of apparatuses and methods consistent with some aspects of the present disclosure as described in the appended claims.

At present, different video applications may have different setup functions and different setup interfaces.

Typically, for various video applications installed on a terminal, various operations can only be performed by their own setup operations. Moreover, the setup options of different video applications are different in contents and operation interfaces. As such, in this approach, the operation video applications may lack universality, and the user experience may be adversely affected.

Various embodiments of the present disclosure can provide a method and apparatus for video control, which can apply a same setup tool to all video applications and provide a user with settings of various video application functions.

FIG. 1 is a flowchart of a method for video control according to some embodiments. The method is applicable to a terminal equipment. As shown FIG. 1, the method includes the following operations.

Step S101: Video application setup options are displayed on a video playback interface; the video application setup options being used for setting video application functions corresponding to video usage effects.

Step S102: A setup operation is received by one of the video application setup options.

Step S103: Video data to be played is correspondingly processed and played according to a video application function corresponding to the setup operation.

Herein, the video application setup options may be configured in the terminal equipment in advance. For example, the video application setup options are added in the system configuration of the terminal equipment. The video application setup options may be applied to the terminal equipment's own video operation applications, for example, a video player of the terminal equipment or the like. The video application setup options may also be applied to various video applications installed on the terminal equipment and provided by a third party, for example, applications in various video websites, various video players or the like.

The video application functions corresponding to video usage effects may include various functions related to the user's visual effect, auditory effect, user experience or the like, for example, functions such as video display effect, sound effect, and video playback mode.

In the process of correspondingly processing and playing video data to be played according to a video application function corresponding to the setup operation, the received setup information can be determined according to one or more video application setup options operated by the user. The video data to be played is correspondingly processed and played. For example, when the user selects a black-and-white display function by the video application setup option, it can be determined that the received setup information is the use of a black-and-white display mode for the image data in the video data. In this case, the image data in the video data to be played is converted into monochromatic black-and-white image data for playing and displaying. In this way, the played video pictures are black-and-white pictures.

As such, in this embodiment, by additionally providing video application setup options, a terminal equipment has the ability to uniformly operate various video applications. That is, free from video processing functions of various video applications, the terminal equipment can perform, according to an operation instruction initiated by a user, corresponding video processing operations on various video applications and various video scenarios.

This embodiment further provides a method for video control, further including steps of:

receiving a call operation for the video application setup option; and displaying, according to the call operation, the video application setup option on the video playback interface.

The video application setup option may be displayed by the call operation. That is, an operation interface of the video application setup option can be displayed on the video playback interface only when the call operation is received. The implementation of the call operation may be configured in advance. For example, the call mode of the video application setup option defaulted in the system setup option is to perform a touch operation on the left edge of the screen. In this case, during the video playback process, if a touch-screen operation is detected in a preset region on the left edge of the screen, it is determined that a call operation of the video application setup option is received. In this case, the operation interface of the video application setup option can be displayed on the video playback interface. For another example, the call mode for setting the video application setup option according to the user's operation is to long-press the volume key. In this case, during the video playback process, if an operation of long-pressing the volume key is detected, it is determined that a call operation for the video application setup option is received. In this case, the operation interface of the video application setup option can be displayed on the video playback interface.

Thus, in this embodiment, the video application setup option is displayed in real time according to the call operation, so that it is convenient for the user to use various video application function services. This operation mode is simple and quick, and the user's experience when using the video application setup option is improved.

This embodiment further provides a method for video control. In this method, the video application setup options at least include options corresponding to any one of the following video application functions:

a first type of options used for setting display effects of a video application; and a second type of options used for setting interaction effects of a video application interacting with other applications.

The first type of options used for setting the display effect of the video application may include options related to the display effect of the video, for example, various options corresponding to the display effect of video pictures, the audio effect in the video, the video playback mode, the video data storage mode or the like.

For example, various function options corresponding to the display effect of the video include function options such as black-and-white display mode, style mode, exquisite picture display or the like. When the black-and-white mode function is activated, the played video pictures are black-and-white pictures. When the style mode function is activated, the video is played in the set style. When the exquisite picture display function is activated, the definition and/or pixel of the played video pictures are consistent with the definition and/or pixel required by the exquisite picture quality.

For example, various function options corresponding to the sound effect of the video include sound effect enhance mode, Dolby mode or the like. When the sound effect enhancement mode function is activated, the sound in the played video is played according to the parameters configured for the sound effect enhancement mode. When the Dolby mode function is activated, the sound in the played video is played according to Dolby pro-logic surround parameters.

For example, various function options corresponding to the video playback mode include playback speed, screen projection playback or the like. By the playback speed option, the speed of the video to be played can be set to a normal speed or a set times of the normal speed. By the screen projection playback option, the displayed video can be set to be played on another display device.

For example, various function options corresponding to the video storage mode include screen recording, screen capture or the like. By the screen recording option, the played video data can be set to be stored synchronously. By the screen capture option, it can be set that an image frame in the video data at the moment when the screen capture operation is performed is stored.

The second type of options used for setting the interaction effect of the video application interacting with other applications may include function options corresponding to other applications that are simultaneously operated with the video application. For example, the functions include a function of displaying other applications by a floating window, a function of sharing the videos with other applications or the like. When the function of displaying other applications by a floating window is activated, the operation interfaces of other applications can be displayed in form of floating windows above the interface of the played video. When the function of sharing the video with other applications is activated, the currently played video data can be shared to contacts in a third-party application.

It can be known from the foregoing description that the video application setup options in this embodiment provide various functions, so that the types of video processing functions are enriched and the user's experience when using the video application setup option is improved.

This embodiment further provides a method for video control. In this method, the receiving a setup operation by one of the video application setup options includes:

receiving any one or more of the following setup operations by the first type of options:

an operation of setting a video playback mode;

an operation of setting a video storage mode;

an operation of setting a video display effect; and an operation of setting a video sound effect.

The operations of setting the video playback mode may include screen projection, listening with screen off, timed close, playing in the background or the like. When setting the screen projection, the video data is transmitted to another display device, so that the screen projection device displays the currently played video data. When setting listening with screen off, the terminal equipment can be controlled to be in the listening with screen off mode, and only the audio data in the video data is played. When setting the timed close, a timing operation is performed according to the preset duration, and video application is closed when it's the preset time. When setting playing in the background, the video playback interface is minimized and the video data is normally played. The operation of setting the video storage mode may include screen recording, screen capture or the like. For example, when setting screen recording, the currently played video data can be backed up to the specified location. For example, when setting screen capture, all or some of frames in the image frames played at the current moment are cached or stored to the specified location.

The operations of setting the video display effect may include various operations related to the video display effect. For example, the operation is any operation of setting the display mode as a black-and-white display mode, a style mode, an exquisite picture display mode or a mirror flipping display mode. When setting the black-and-white display mode, the image data in the video data is converted into monochromatic black-and-white image data for playing and displaying. When setting the style mode, the image data in the video data is processed according to display parameters corresponding to the set style and then played and displayed. When setting the exquisite picture display, the image data in the video data is converted according to the definition and/or pixel required by the exquisite picture quality and then played and displayed.

The operations of setting the video sound effect may include various operations related to the video sound effect. For example, the operations include setting the sound effect enhancement mode, the Dolby mode or the like. When setting the sound effect enhancement mode, the audio data in the video data is played and displayed according to the parameters configured for the sound effect enhancement mode. When setting the Dolby mode, the audio data in the video data is played and displayed according to the Dolby pro-logic surround parameters.

It can be known from the foregoing description that the video application setup options provided in this embodiment is diverse, so that the types of video processing functions are enriched and the user's experience when using the video processing functions is improved.

This embodiment further provides a method for video control. In this method, the receiving a setup operation by one of the video application setup option includes:

receiving any one or more of the following setup operations by the second type of options:

an operation of setting display of other applications on the video playback interface; and an operation of setting transmission of video data to other applications.

The operation of setting display of other applications on the video playback interface may include displaying operation interfaces of other applications above the video playback window in a set manner (e.g., in a floating manner). In this way, during the playback of the video data, the user's requirements for the use of other applications will not be influenced.

The operation of setting transmission of video data to other applications may be sharing the currently played video data with contacts in other applications or the like.

It can be known from the foregoing description that the video application setup options provided in this embodiment are diverse, so that the function of simultaneously using other applications and the video application is provided in the video application scenario and the user's experience when using the video application setup option is improved.

This embodiment further provides a method for video control, further including:

setting configuration information of the video application setup option, the configuration information at least including any one of the following information:

a call mode of the video application setup option;

a display mode of the video application setup option; and an application range of the video application setup option.

The configuration information of the video application setup option may be set and stored before the terminal equipment consignment, or may be set by the user. For example, the application setup options may be added in the system setup of the terminal equipment. In this case, the configuration information of the application setup options is stored at the specified location of the system setup.

The call mode of the video application setup option may include various call modes. For example, when the call mode is configured as calling by a shortcut key, the user can call the application setup option by clicking the preconfigured shortcut key. For another example, when the call mode is configured as calling by a specified operation gesture, the user can call the application setup option according to the preconfigured specified operation gesture. For example, the application set option can be called by a touch-screen operation such as double clicking or directional sliding in a specified display region.

The display mode of the video processing function may include displaying information of the video application setup option. For example, on the video playback interface, the operation interface of the video application setup option is displayed in a fade-in fade-out manner. For another example, on the video playback interface, the operation interface of the video application setup option is displayed in form of a window that can be hidden. For still another example, on the video playback interface, the operation interface of the video application setup option is displayed translucently.

The application range of the video application setup option may include calling application or scenario information corresponding to the video application setup option, or the like. For example, in a video application that is provided by a third party and selected by the user, the application setup option can be called. For another example, in a scenario selected by the user, for example, when the video is viewed in full screen, the application setup option can be called.

In this embodiment, by setting the configuration information of the video application setup option, the operation mode of the video application setup option better satisfies the user's actual needs and the user's experience when using the application setup option is improved.

Figure 2:
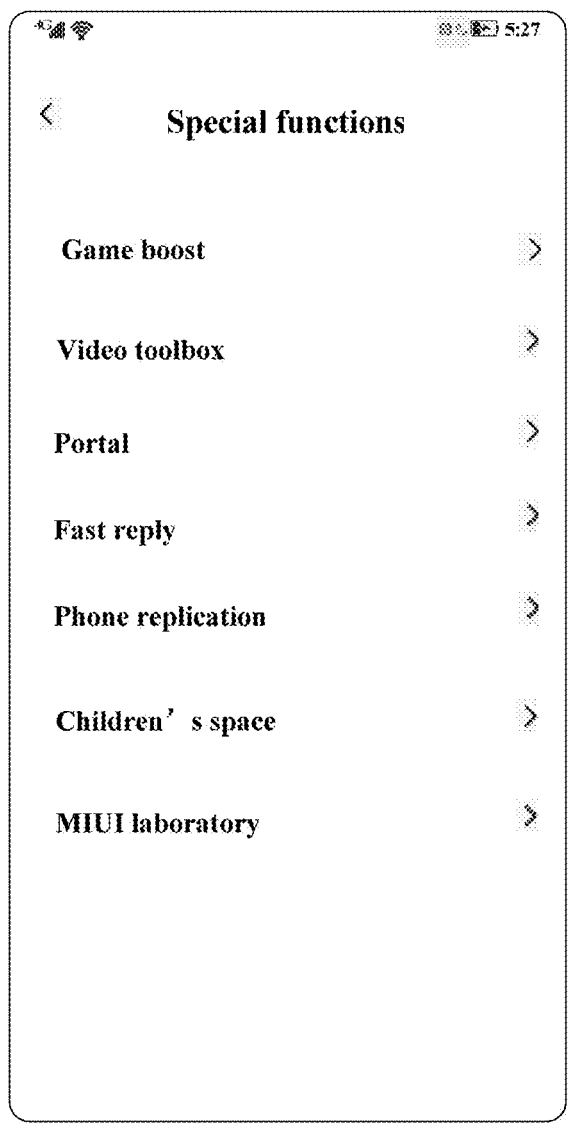
FIG. 2 is a schematic view of adding a video toolbox in a system setup option to realize video control in the method for video control according to some embodiments.
Figure 3:
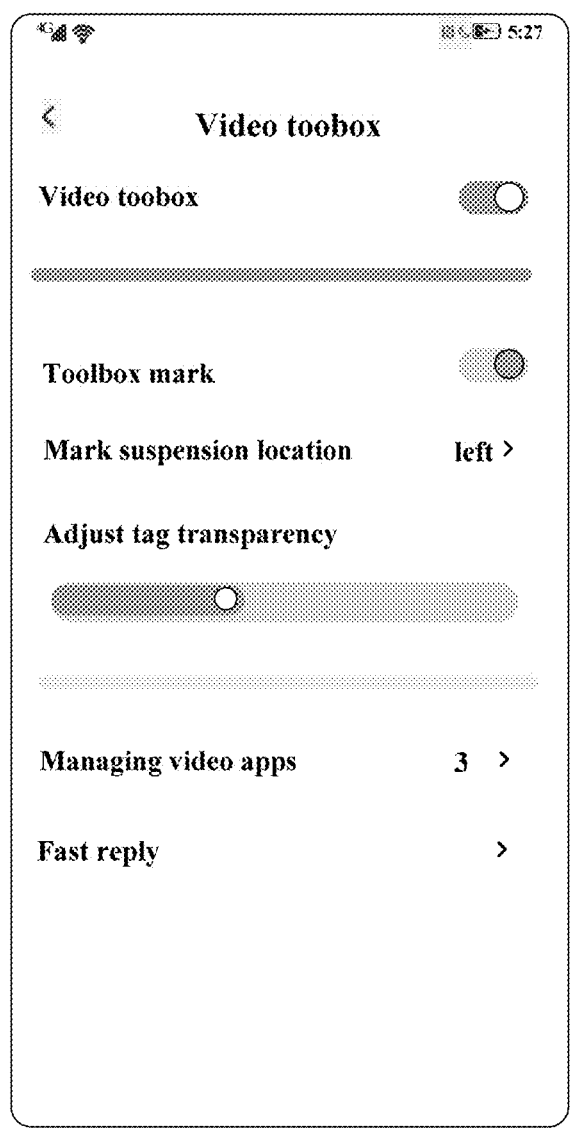
FIG. 3 is a schematic view of a configuration interface for the video toolbox in the method for video control according to some embodiments.

In some applications, the video application setup option can be referred to as a video toolbox. A video toolbox option can be added in the system setup option of the terminal equipment, as shown in FIG. 2. The configuration information of the video toolbox is shown in FIG. 3. When the option corresponding to the video toolbox is in a selected state, it is indicated that the video toolbox function in the terminal equipment is already activated, and various functions of the video toolbox can be normally used in various video applications. The toolbox mark indicates the location on the side of the screen where the toolbox is called, and the corresponding option is in a selected state. That is, the way of calling the video toolbox in the terminal equipment may include clicking the side of the screen. The marked suspension location indicates that the operation interface of the called video toolbox can be suspended and displayed on the left side of the screen, that is, the display mode of the video toolbox includes suspending and displaying on the left side of the screen.

Figure 4:
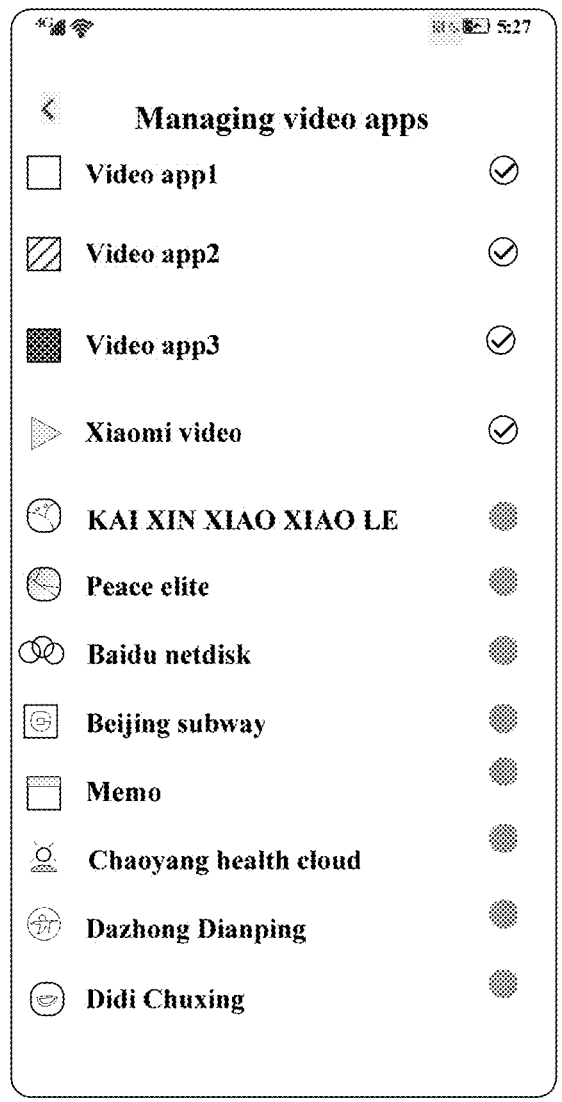
FIG. 4 is a schematic view of a setup interface for the application range of the video toolbox in the method for video control according to some embodiments.

Additionally, the transparency of the operation interface of the video toolbox can be adjusted by the slider in FIG. 3, that is, the display mode of the video toolbox includes displaying the operation interface according to the set transparency. Managing video applications belongs to the application range of the video toolbox. For example, FIG. 4 shows the application range of the video toolbox. It can be known from FIG. 4 that the options of the first four video applications displayed are in a selected state, that is, various video application functions can be operated in the four video applications by using the terminal equipment's own video toolbox.

Figure 5:
FIG. 5 is a schematic view of a display interface for a video application using the video toolbox function in the method for video control according to some embodiments.

Upon entering a video application that can use the video toolbox, the video picture played by the video application is shown in FIG. 5. In the above configured way of calling the video toolbox in the terminal equipment, the operation interface of the video toolbox can be called by clicking the side of the screen, and this operation interface is suspended on the left side of the screen. It can be known from FIG. 6 that the operation interface of the video toolbox can be divided into three display regions.

The first display region can be used for displaying shortcut functions which may include one or more functions used at a higher frequency.

The second display region can be used for displaying a video special effect functions, and various options included in the video special effect function belong to the above-described first type of options used for setting the display effect of the video application.

The third display region can be used for displaying a floating window application functions, and various options included in the floating window application functions belong to the above-described second type of options used for setting the interaction effect of the video application interacting with other applications. Such functions include various instant messaging tools, albums, browsers, SMS or other applications.

A setup option can be provided on the top right of the operation interface of the video toolbox. When the user clicks the setup option, the terminal equipment skips back to the setup interface of the configuration information of the video toolbox shown in FIG. 3, and the user can alter the current configuration information.

Figure 6:
FIG. 6 is a schematic view of a display interface for calling out the video toolbox in the method for video control according to some embodiments.

The shortcut function can include four options, e.g., screen recording, screen projection, screen capture, and listening with screen off. The first three options are displayed on the first page of the first display region, as shown in FIG. 6.

Figure 7:
FIG. 7 is a schematic view of an interface of displaying the second page corresponding to a shortcut function in the method for video control according to some embodiments.

The first page in the first display region can be switched to the second page by sliding left in the first display region to display listening with screen off option, as shown in FIG. 7.

When the user selects the screen capture option, the screen capture option is lightened, and it is indicated that the screen capture function is activated. In this case, it is determined that the operation of setting the video storage mode is received, where the storage mode is saving the picture data of the currently selected region. Thus, the picture data of the currently selected region can be stored to the specified location. In this embodiment, the four options included in the shortcut function are merely illustrative. In practical applications, it is possible to add options in the shortcut function according to the user's operation, for example, adding a close time setting function. It is also possible to delete one or more of the options in the shortcut function according to the user's operation.

Figure 8:
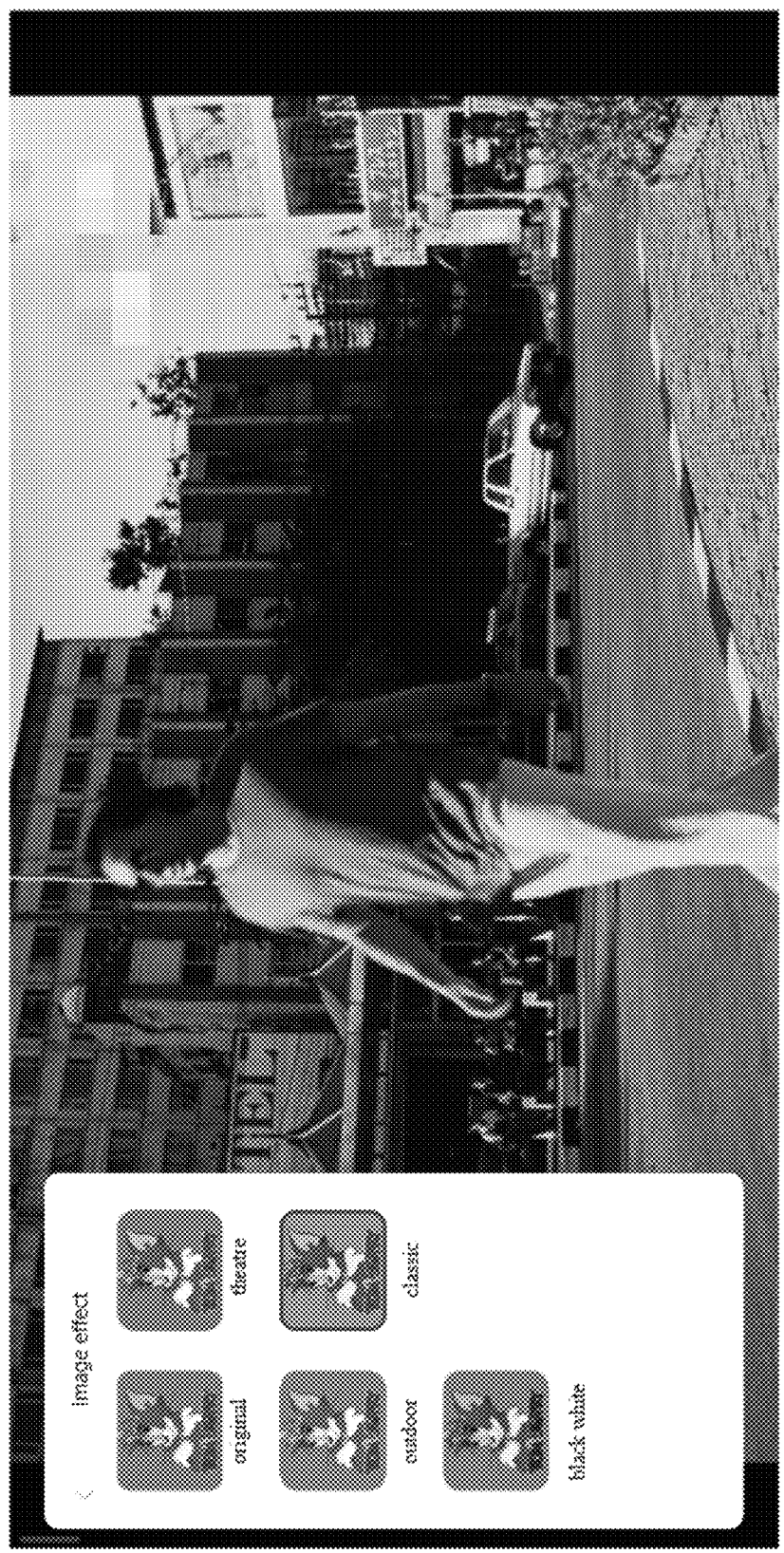
FIG. 8 is a schematic view of a display interface when selecting an image style under the video special effect function in the method for video control according to some embodiments.

The video special effect function can include image style, sound effect enhancement, exquisite picture quality or other options. When the image style option is clicked, the specific setup page shown in FIG. 8 is entered. When the user selects a certain style, the image style option is lightened, and it is indicated that the image style function is activated. In this case, it is determined that the operation of setting the video display effect is received, where the display effect is the display style selected by the user. The video data to be played is subjected to corresponding image processing and then played and displayed according to the selected display style.

Figure 9:
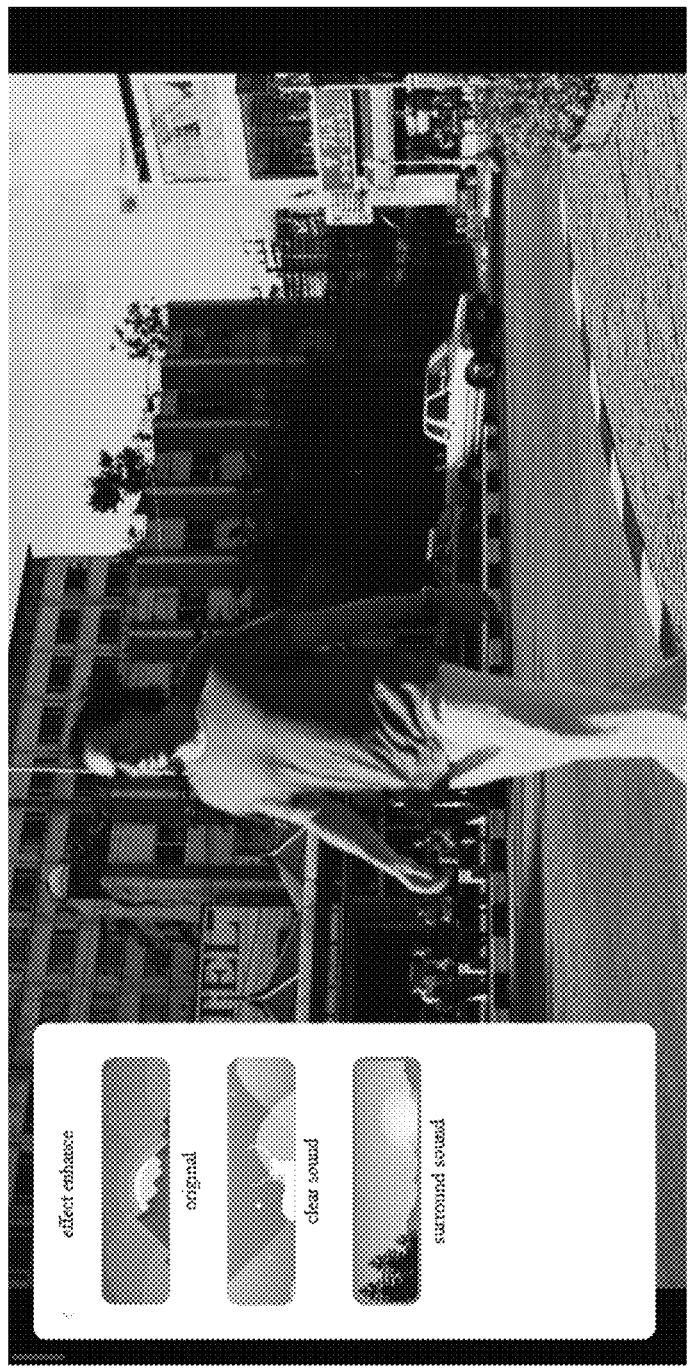
FIG. 9 is a schematic view of a setup interface for sound effect enhancement in the method for video control according to some embodiments.

When the sound effect enhancement option is clicked, the specific setup page shown in FIG. 9 is entered. When the user selects a certain sound effect, the sound effect enhancement option is lightened, and it is indicated that the sound effect enhancement function is activated. In this case, it is determined that the operation of setting the video sound effect is received, where the sound effect is the sound effect enhancement mode selected by the user. The video data to be played is subjected to audio processing and then played and displayed according to the selected sound effect enhancement mode.

Figure 10:
FIG. 10 is a schematic view of a setup interface for the exquisite picture quality in the method for video control according to some embodiments.

When the exquisite picture quality option is clicked, the specific setup page shown in FIG. 10 is entered. When the user selects a picture quality, the exquisite picture quality option is lightened, and it is indicated that the exquisite picture quality function is activated. Additionally, the exquisite picture quality may be in form of a white list. When a foreground application is not in the white list, this option is set to be gray, that is, the current application does not support this function operation. In this case, it is determined that the operation of setting the video display effect is received, where the display effect is the exquisite picture quality selected by the user. The pixels of images in the video data to be played are converted into pixels corresponding to the exquisite picture quality and then played and displayed.

Figure 11:
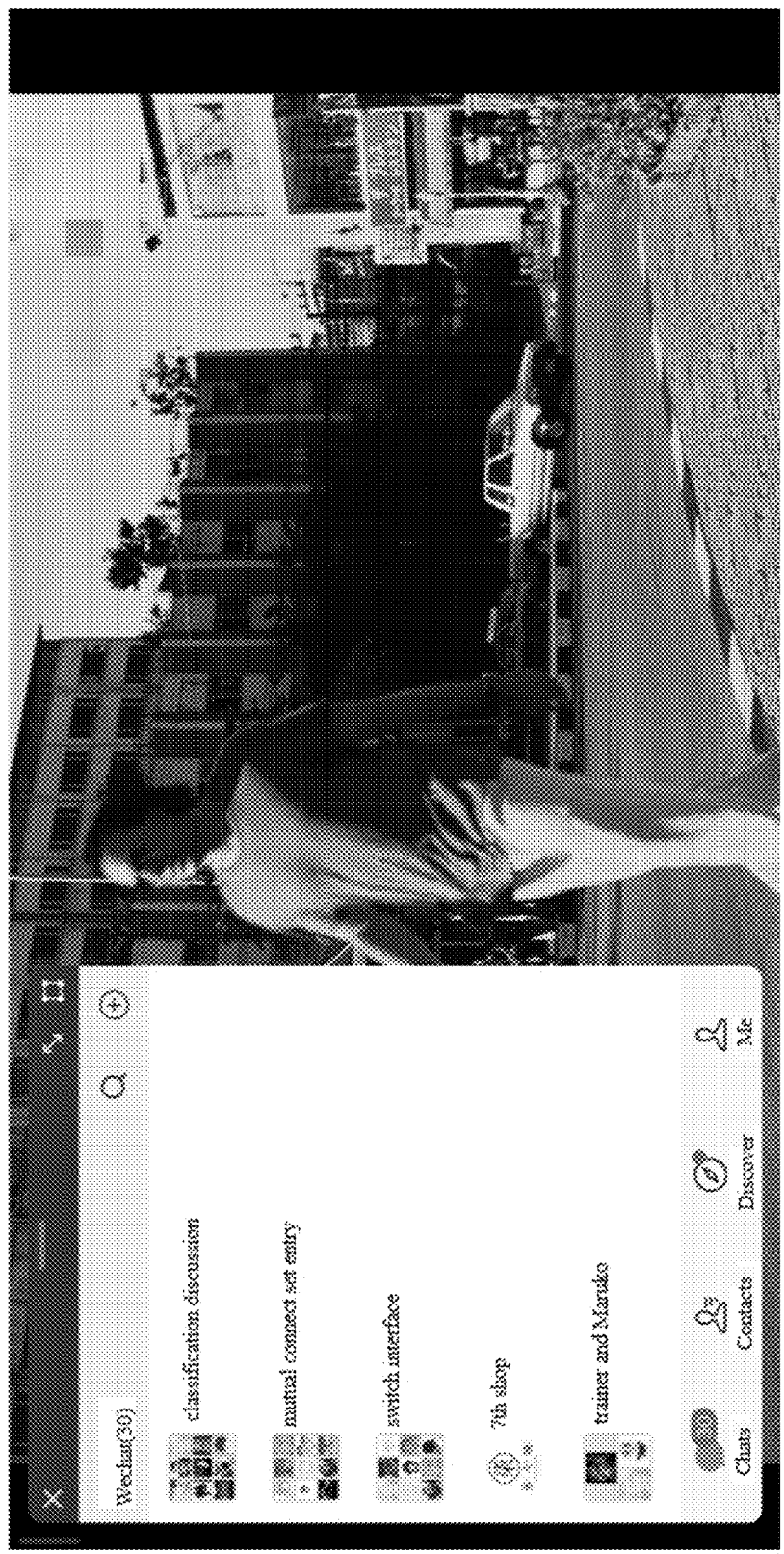
FIG. 11 is a schematic view of an interface after selecting a floating window application by a user in the method for video control according to some embodiments.

When the user clicks the floating window to display a certain application, it can be determined that the operation of setting display of other applications on the video playback interface is received, where the way of displaying other applications is displaying by the floating window. In this case, the operation interface of the application selected by the user is displayed in form of the floating window. In this case, the display interface of the terminal equipment is shown in FIG. 11. During the display of applications by the floating window, applications operated recently can be displayed by default. If there are multiple applications, the applications can be sequentially displayed in the ranking order. Sequential displaying can be performed according to the number of historical operations. That is, the larger the number of historical operations is, the higher the rank is.

Figure 12:
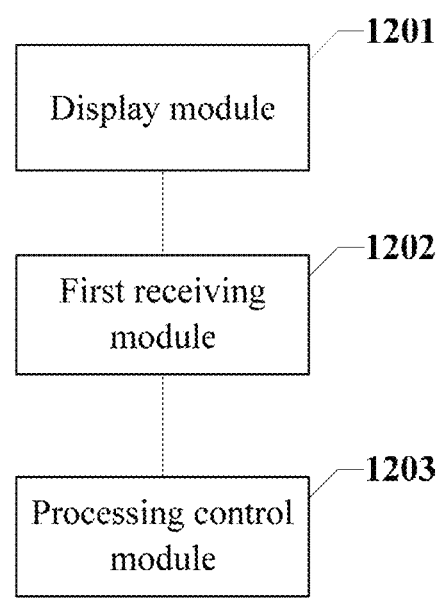
FIG. 12 is a block diagram of an apparatus for video control according to some embodiments.

FIG. 12 is a block diagram of an apparatus for video control according to some embodiments. As shown in FIG. 12, the apparatus includes a display module 1201, a first receiving module 1202 and a processing control module 1202.

The display module 1201 is configured to display a video application setup options on a video playback interface, the video application setup options being used for setting video application functions corresponding to video usage effects.

The first receiving module 1202 is configured to receive a setup operation by one of video application setup options.

The processing control module 1203 is configured to correspondingly process and play video data to be played according to a video application function corresponding to the setup operation.

This embodiment further provides an apparatus for video control, further including:

a second receiving module configured to receive a call operation of the video application setup option; and the display module is configured to display, according to the call operation, the video application setup option on the video playback interface.

This embodiment further provides an apparatus for video control. In this apparatus, the video application setup options at least includes any one of the following options:

a first type of options used for setting display effects of a video application; and a second type of options used for setting interaction effects of the video application interacting with other applications.

This embodiment further provides an apparatus for video control. In this apparatus, the first receiving module receiving a setup operation by one of the video application setup options includes:

receiving any one or more of the following setup operations by the first type of options:

an operation of setting a video playback mode;

an operation of setting a video storage mode;

an operation of setting a video display effect; and an operation of setting a video sound effect.

This embodiment further provides an apparatus for video control. In this apparatus, the first receiving module receiving a setup operation by one of the video application setup options includes:

receiving any one or more of the following setup operations by the second type of options:

an operation of setting display of other applications on the video playback interface; and an operation of setting transmission of video data to other applications.

This embodiment further provides an apparatus for video control, further including:

a configuration module configured to set configuration information of the video application setup option, the configuration information at least including any one of the following information:

a call mode of the video application setup option;

a display mode of the video application setup option; and an application range of the video application setup option.

For the apparatuses in the foregoing embodiments, the specific operations executed by each unit have been described in detail in the embodiments of the methods, and will not be repeated here.

Figure 13:
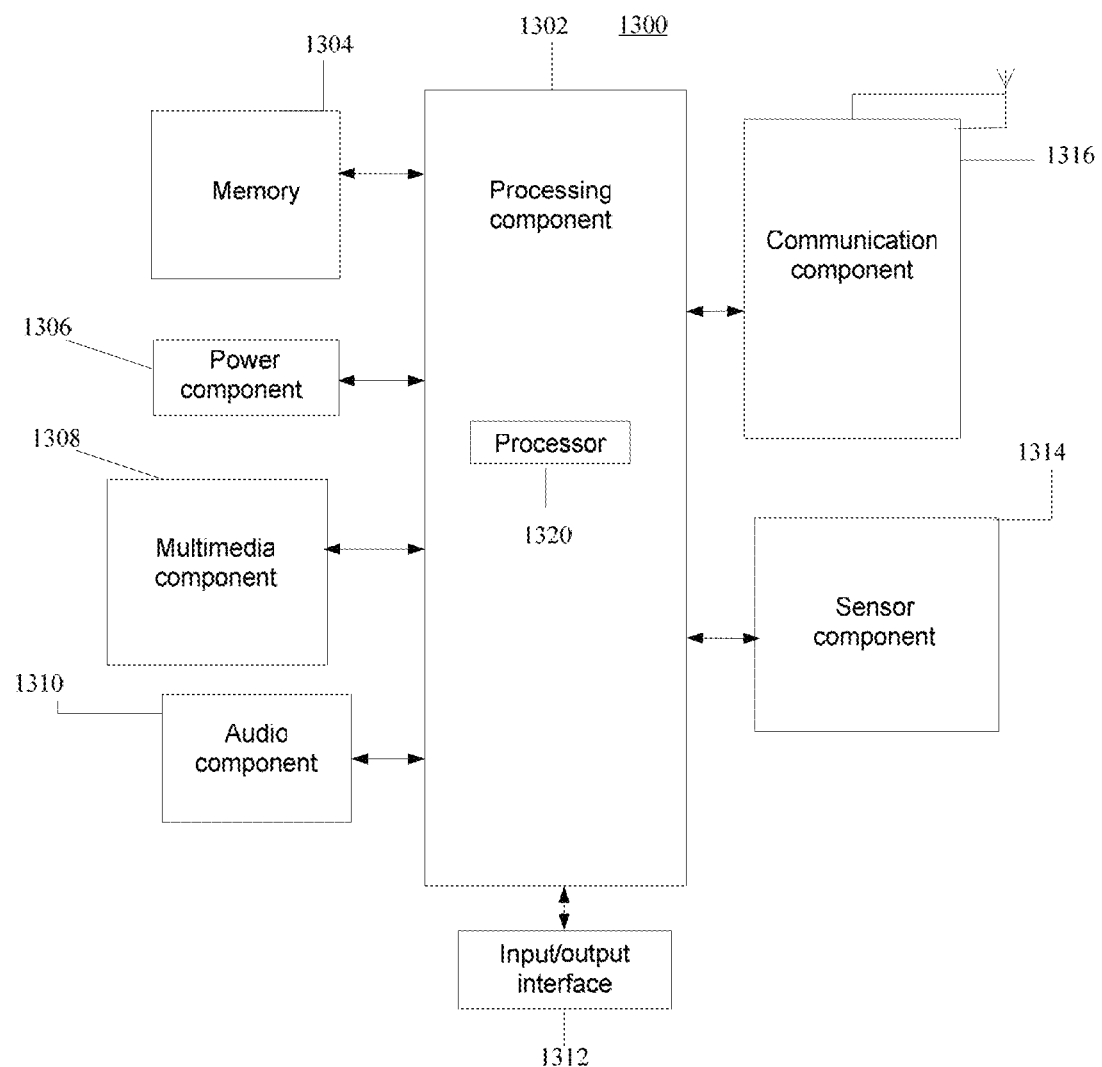
FIG. 13 is a block diagram of an apparatus for video control according to some embodiments.

FIG. 13 is a block diagram of an apparatus 1300 for video control according to some embodiments. For example, the apparatus 1300 may be a mobile phone, a computer, a digital broadcasting terminal, a messaging device, a game console, a tablet device, a medical device, a fitness device, a personal digital assistant or the like.

With reference to FIG. 13, the apparatus 1300 may include one or more of the following components: a processing component 1302, a memory 1304, a power component 1306, a multimedia component 1308, an audio component 1310, an input/output (I/O) interface 1312, a sensor component 1314 and a communication component 1316.

The processing component 1302 generally controls the overall operation of the apparatus 1300, such as operations associated with display, telephone call, data communication, camera operations and recording operations. The processing component 1302 may include one or more processors 1320 to execute instructions to complete all or some of the steps in the methods described above. Additionally, the processing component 1302 may include one or more modules to facilitate interaction between the processing component 1302 and other components. For example, the processing component 1302 may include a multimedia module to facilitate interaction between the multimedia component 1308 and the processing component 1302.

The memory 1304 is configured to store various types of data to support the operation of the apparatus 1300. Examples of the data include instructions for any application or method operating on the apparatus 1300, contact data, phonebook data, messages, pictures, video or the like. The memory 1304 may be implemented by any type of volatile or non-volatile storage devices or a combination thereof, for example, static random access memories (SRAMs), electrically erasable programmable read-only memories (EEPROMs), erasable programmable read-only memories (EPROMs), programmable read-only memories (PROMs), read-only memories (ROMs), magnetic memories, flash memories, magnetic disks or optical disks.

The power component 1306 supplies power to various components of the apparatus 1300. The power component 1306 may include a power management system, one or more power supplies, and other components associated with the generation, management and distribution of power for the apparatus 1300.

The multimedia component 1308 includes a screen to provide an output interface between the apparatus 1300 and a user. In some embodiments, the screen may include a Liquid Crystal Display (LCD) and a Touch Panel (TP). In some embodiments, organic light-emitting diode (OLED) or other types of displays can be employed.

If the screen includes a TP, the screen may be implemented as a touch screen to receive input signals from the user. The touch panel includes one or more touch sensors to sense touch, slide and gestures on the touch panel. The touch sensor may sense the boundary of a touch or slide action, and also detect the duration and pressure related to the touch or slide operation. In some embodiments, the multimedia component 1308 includes a front camera and/or a rear camera. When the apparatus 1300 is in an operation mode, for example, a shooting mode or a video mode, the front camera and/or the rear camera may receive external multimedia data. Each of the front camera and the rear camera may be a fixed optical lens system or have a focal length and an optical zooming capability.

The audio component 1310 is configured to output and/or input audio signals. For example, the audio component 1310 includes a microphone (MIC). When the apparatus 1300 is in an operation mode, for example, a call mode, a recording mode or a voice recognition mode, the microphone is configured to receive external audio signals. The received audio signals may be further stored in the memory 1304 or transmitted via the communication component 1316. In some embodiments, the audio component 1310 further includes a loudspeaker configured to output the audio signals.

The I/O interface 1312 provides an interface between the processing component 1302 and a peripheral interface module. The peripheral interface module may be a keyboard, a click wheel, buttons or the like. These buttons may include, but not limited to, a Home button, a Volume button, a Start button and a Lock button.

The sensor component 1314 includes one or more sensors configured to provide state evaluation of various aspects of the apparatus 1300. For example, the sensor component 1314 may detect the on/off state of the apparatus 1300 and the relative position of a component. For example, if the component is a display and a keypad of the apparatus 1300, the sensor component 1314 may also detect the position change of the apparatus 1300 or one component of the apparatus 1300, the presence or absence of the user's contact with the apparatus 1300, the orientation or acceleration/deceleration of the apparatus 1300 and the temperature change of the apparatus 1300. The sensor component 1314 may include a proximity sensor configured to detect the presence of nearby objects without any physical contact. The sensor component 1314 may further include an optical sensor (e.g., a CMOS or CCD image sensor) for use in imaging applications. In some embodiments, the sensor component 1314 may further include an acceleration sensor, a gyroscope sensor, a magnetic sensor, a pressure sensor or a temperature sensor.

The communication component 1316 is configured to facilitate the wired or wireless communication between the apparatus 1300 and other devices. The apparatus 1300 may access to a wireless network based on communication standards, for example, Wi-Fi, 2G, 3G, 4G, 5G, or a combination thereof. In some embodiments, the communication component 1316 receives a broadcast signal or broadcast related information from an external broadcast management system via a broadcast channel. In some embodiments, the communication component 1316 further includes a Near-Field Communication (NFC) module to facilitate short-range communication. For example, the NFC module may be implemented based on radio frequency identification (RFID) technologies, infrared data association (IrDA) technologies, ultra-wide band (UWB) technologies, Bluetooth (BT) technologies and other technologies.

In some embodiments, the apparatus 1300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to execute the methods described above.

In some embodiments, a non-transitory computer-readable storage medium including instructions is further provided, for example, the memory 1304 including instructions. The instructions may be executed by the processor 1320 of the apparatus 1300 to complete the methods described above. For example, the non-transitory computer-readable storage medium may be ROMs, random access memories (RAMs), CD-ROMs, magnetic tapes, floppy disks, optical data storage devices or the like.

The instructions stored in the storage medium, when executed by a processor of a mobile terminal, can enable the mobile terminal to execute a method for video control, the method including steps of:

displaying video application setup options on a video playback interface, the video application setup options being used for setting video application functions corresponding to video usage effects;

receiving a setup operation by one of video application setup options; and correspondingly processing and playing video data to be played according to a video application function corresponding to the setup operation.

Various embodiments of the present disclosure can have one or more of the following advantages.

By using a video application setup option, a terminal can have the ability to uniformly process various videos. That is, free from video processing functions of various video applications, the terminal can perform, according to an operation instruction initiated by a user, corresponding video processing operations on various video applications and various video scenarios.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for video control, the method performed by a mobile terminal, the method comprising:

displaying video application setup options on a video playback interface, the video application setup options being used for setting video application functions corresponding to video usage effects, wherein the video application setup options are set in system configuration of the terminal and applied to various video operation applications installed on the terminal;

receiving setup information including a setup operation by user selection of one of the video application setup options; and correspondingly processing and playing video data according to a video application function among the video application functions based on the user selection and the setup operation;

wherein the mobile terminal comprises a display screen configured to display the video data; wherein the method further comprises:

uniformly processing a plurality of different types of videos free from video processing functions of a plurality of different types of video applications; and performing, according to an operation instruction initiated by a user, corresponding video processing operations on the plurality of different types of video applications and a plurality of different video scenarios;

wherein the video application setup options are configured in the terminal in advance and included in the system configuration of the mobile terminal, and are applied to pre-installed video operation applications of the terminal, and third-party provided video operation applications;

wherein the video application functions include at least one of video display effect, video sound effect, and video playback mode;

wherein the method further comprises:

upon the user selecting a black-and-white display function using the video application setup options, determining that the received setup information is a black-and-white display mode for image data in the video data;

in response to the determining that the received setup information is the black-and-white display mode:
 converting the image data in the video data into monochromatic black-and-white image data; and
 playing and displaying the black-and-white image data on the display screen; and displaying the video application setup options on the video playback interface upon receiving a call operation from the user, wherein the call operation comprises at least a touch operation on a predetermined region of the display screen, and a long-press of a volume key of the mobile terminal.

2. The method according to claim 1, further comprising:
receiving the call operation; and
displaying, according to the call operation, the video application setup options on the video playback interface.

3. The method according to claim 2, wherein the video application setup options at least comprise options corresponding to any one of following video application functions:
a first type of options used for setting display effects of the video applications; and
a second type of options used for setting interaction effects of the video applications interacting with other applications.

4. The method according to claim 1, wherein the video application setup options at least comprise options corresponding to one or more of following video application functions:
a first type of options used for setting display effects of the video applications; and
a second type of options used for setting interaction effects of the video applications interacting with other applications.

5. The method according to claim 4, wherein the receiving setup information including a setup operation by user selection of one of the video application setup options comprises:
receiving any one or more of following setup operations by the first type of options:
an operation of setting the video playback mode;
an operation of setting a video storage mode;
an operation of setting the video display effect; and
an operation of setting the video sound effect.

6. The method according to claim 4, wherein the receiving setup information including a setup operation by user selection of one of the video application setup options comprises:
receiving any one or more of following setup operations by the second type of options:
an operation of setting display of the other applications on the video playback interface; and
an operation of setting transmission of video data to applications other than the video applications.

7. The method according to claim 4, further comprising:
setting configuration information of the video application setup options, the configuration information at least comprising any one of:
a call mode of the video application setup options;
a display mode of the video application setup options; and
an application range of the video application setup options.

8. A mobile device that is configured to perform the method of claim 1, the mobile device being the mobile terminal.

9. An apparatus for video control, comprising:
a processor; and
memory storing instructions for execution by the processor to:
display video application setup options on a video playback interface, the video application setup options being used for setting video application functions corresponding to video usage effects, the video application setup options are set in system configuration of the apparatus and applied to various video operation applications installed on the apparatus;
receive setup information including a setup operation by user selection of one of video application setup options; and
correspondingly process and play video data to be played according to a video application function among the video application functions based on the user selection and the setup operation;
wherein the mobile terminal comprises a display screen configured to display the video data; wherein the method further comprises:
uniformly processing a plurality of different types of videos free from video processing functions of a plurality of different types of video applications; and
performing, according to an operation instruction initiated by a user, corresponding video processing operations on the plurality of different types of video applications and a plurality of different video scenarios;
wherein the video application setup options are configured in the terminal in advance and included in the system configuration of the mobile terminal, and are applied to pre-installed video operation applications of the terminal, and third-party provided video operation applications;
wherein the video application functions include at least one of video display effect, video sound effect, and video playback mode;
wherein the method further comprises:
upon the user selecting a black-and-white display function using the video application setup options, determining that the received setup information is a black-and-white display mode for image data in the video data;
in response to the determining that the received setup information is the black-and-white display mode:
converting the image data in the video data into monochromatic black-and-white image data; and
playing and displaying the black-and-white image data on the display screen; and
displaying the video application setup options on the video playback interface upon receiving a call operation from the user, wherein the call operation comprises at least a touch operation on a predetermined region of the display screen, and a long-press of a volume key of the mobile terminal.

10. The apparatus according to claim 9, wherein the instructions further cause the processor to:
receive the call operation; and
display, according to the call operation, the video application setup options on the video playback interface.

11. The apparatus according to claim 10, wherein the video application setup options comprise at least one of:
a first type of options used for setting display effects of the video applications; and
a second type of options used for setting interaction effects of the video applications interacting with other applications.

12. The apparatus according to claim 9, wherein the video application setup options comprise at least one of:
a first type of options used for setting display effects of the video applications; and
a second type of options used for setting interaction effects of the video applications interacting with other applications.

13. The apparatus according to claim 12, wherein the instructions further cause the processor to:

receive at least one of following setup operations by the first type of options:
an operation of setting the video playback mode;
an operation of setting a video storage mode;
an operation of setting the video display effect; and
an operation of setting the video sound effect.

14. The apparatus according to claim 12, wherein the instructions further cause the processor to:
receive any one or more of following setup operations by the second type of options:
an operation of setting display of the other applications on the video playback interface; and
an operation of setting transmission of video data to applications other than the video application.

15. The apparatus according to claim 12, wherein the instructions further cause the processor to:
set configuration information of the video application setup options, the configuration information comprising at least one of:
a call mode of the video application setup options;
a display mode of the video application setup options; and
an application range of the video application setup options.

16. A non-transitory computer-readable storage medium storing instructions for execution by a processor of a terminal, enabling the terminal to execute a method for video control, the method comprising operations of:
displaying video application setup options on a video playback interface, the video application setup options being used for setting video application functions corresponding to video usage effects, wherein the video application setup options are set in system configuration of the terminal and applied to various video operation applications installed on the terminal;
receiving setup information including a setup operation by user selection of one of the video application setup options; and
correspondingly processing and playing video data to be played according to a video application function among the video application functions based on the user selection and the setup operation;
wherein the mobile terminal comprises a display screen configured to display the video data; wherein the method further comprises:
uniformly processing a plurality of different types of videos free from video processing functions of a plurality of different types of video applications; and
performing, according to an operation instruction initiated by a user, corresponding video processing operations on the plurality of different types of video applications and a plurality of different video scenarios;
wherein the video application setup options are configured in the terminal in advance and included in the system configuration of the mobile terminal, and are applied to pre-installed video operation applications of the terminal, and third-party provided video operation applications;
wherein the video application functions include at least one of video display effect, video sound effect, and video playback mode;
wherein the method further comprises:
upon the user selecting a black-and-white display function using the video application setup options, determining that the received setup information is a black-and-white display mode for image data in the video data;
in response to the determining that the received setup information is the black-and-white display mode:
converting the image data in the video data into monochromatic black-and-white image data; and
playing and displaying the black-and-white image data on the display screen; and
displaying the video application setup options on the video playback interface upon receiving a call operation from the user, wherein the call operation comprises at least a touch operation on a predetermined region of the display screen, and a long-press of a volume key of the mobile terminal.

* * * * *